United States Patent

[11] 3,571,502

[72] Inventor Russell R. Law
Pacific Palisades, Calif.
[21] Appl. No. 735,383
[22] Filed June 7, 1968
[45] Patented Mar. 16, 1971
[73] Assignee Hughes Aircraft Company
Culver City, Calif.

[54] TV BANDWIDTH REDUCTION SYSTEM WITH REDUCED FIELD RATE
14 Claims, 4 Drawing Figs.

[52] U.S. Cl. .......... 178/6.6, 178/6
[51] Int. Cl. .......... H04n 5/78
[50] Field of Search .......... 178/6 (BWR), 6.6 (A); 178/6.6 (SF), 6.6 (HS)

[56] References Cited
UNITED STATES PATENTS

| | | | |
|---|---|---|---|
| 2,921,124 | 1/1960 | Graham .......... | 178/6BWR |
| 3,366,739 | 1/1968 | Parkinson .......... | 178/6BWR |
| 3,372,228 | 3/1968 | Law .......... | 178/6BWR |
| 3,470,313 | 9/1969 | Bockwoldt .......... | 178/6BWR |

*Primary Examiner*—Robert L. Griffin
*Assistant Examiner*—Joseph A. Orsino, Jr.
*Attorneys*—James K. Haskell and Robert Thompson

ABSTRACT: A video tape recorder system including an encoder for sampling video information in a repetitive pattern of evenly spaced information elements; a multichannel recorder coupled to record the encoded information; and a playback processor for playing back each encoded information element four times—once as a real time information element, and the other three times positioned between the real time information elements as artificial information elements—preferably from the real-time line and the subsequent and preceding interlaced lines of leading and trailing fields, respectively, to fill in the otherwise blank space between spaced real time information elements in the real time field.

Patented March 16, 1971

3,571,502

3 Sheets-Sheet 1

INVENTOR
RUSSELL R. LAW,
BY
Robert Thompson
ATTORNEY

TV BANDWIDTH REDUCTION SYSTEM WITH REDUCED FIELD RATE

BACKGROUND OF THE INVENTION

This invention relates generally to improvements in reduced bandwidth television systems and more particularly to improvements in sampling, recording, and reproducing television signals.

In the television technology, it is sometimes desirable to reduce the bandwidth requirements of a television signal in order to make the signal compatible with the bandwidth limitations of some other medium such as a video tape recorder. One way to reduce the bandwidth requirements is to take advantage of the redundancy in the frame-to-frame video information and the ability of the human sight process to fill in missing information.

In this regard, in my copending patent application, Ser. No. 563,763, entitled TELEVISION BANDWIDTH REDUCTION, filed on Jul. 8, 1966, a system is disclosed in which the video information in each channel is sampled and recorded in a select, evenly spaced, stable pattern that has a residue of $1/X$ in the number of samples on each line so that the pattern recurs every $X$ lines. This sampled information is further divided into complementary sets of data with the information elements of each separate set being interspersed between the information elements of the other set.

SUMMARY OF THE INVENTION

In It is an object of this invention to provide improvements in means and method in processing sampled video data for recording thereof.

Another object is to provide means and method for reducing the bandwidth requirements of signals, such as video information, in a unique manner so that the video information is sampled and reproduced on one channel and provides a high resolution picture.

Another object is to provide a means and method for increasing the resolution of a channel of sampled video information when reproduced.

Other objectives of this invention can be attained by utilization, in a system of the type having an encoder which samples a television luminance signal Y in a stable pattern characterized by evenly spaced sampled data at a line sampling rate having a residue of one-sixth in the number of samples taken per line so that the pattern is repeated every $X$ lines, resulting in complementary fields of sampled data in which the same information area is sampled only once every $n$th field. The sampled bits of data are fed to a recorder operably coupled for recording the sampled data bits on a recording channel. A decoder is operably coupled to receive played back sampled data on the channel and is operable to recombine the played back sampled data into a reconstructed luminance signal Y. A playback processor coupled to received played back sampled data signals from the recorder for utilizing each bit of played back information four times, once as a real element without any delay and the other times as an artificial element after a one field or more delay or with one or more field lead to fill in otherwise blank information areas between real-time data bits on the real-time field, and then feeding the combined time information bits and the artificial information bits to the decoder and to a television receiver where the information bits are reconstructed into a composite luminance picture.

BRIEF DESCRIPTION OF THE DRAWINGS

Other objects, features and advantages of this invention will be become apparent a upon reading the following detailed description and referring to the accompanying drawings, in which.

DESCRIPTION OF THE PREFERRED EMBODIMENTS

Figure 1:
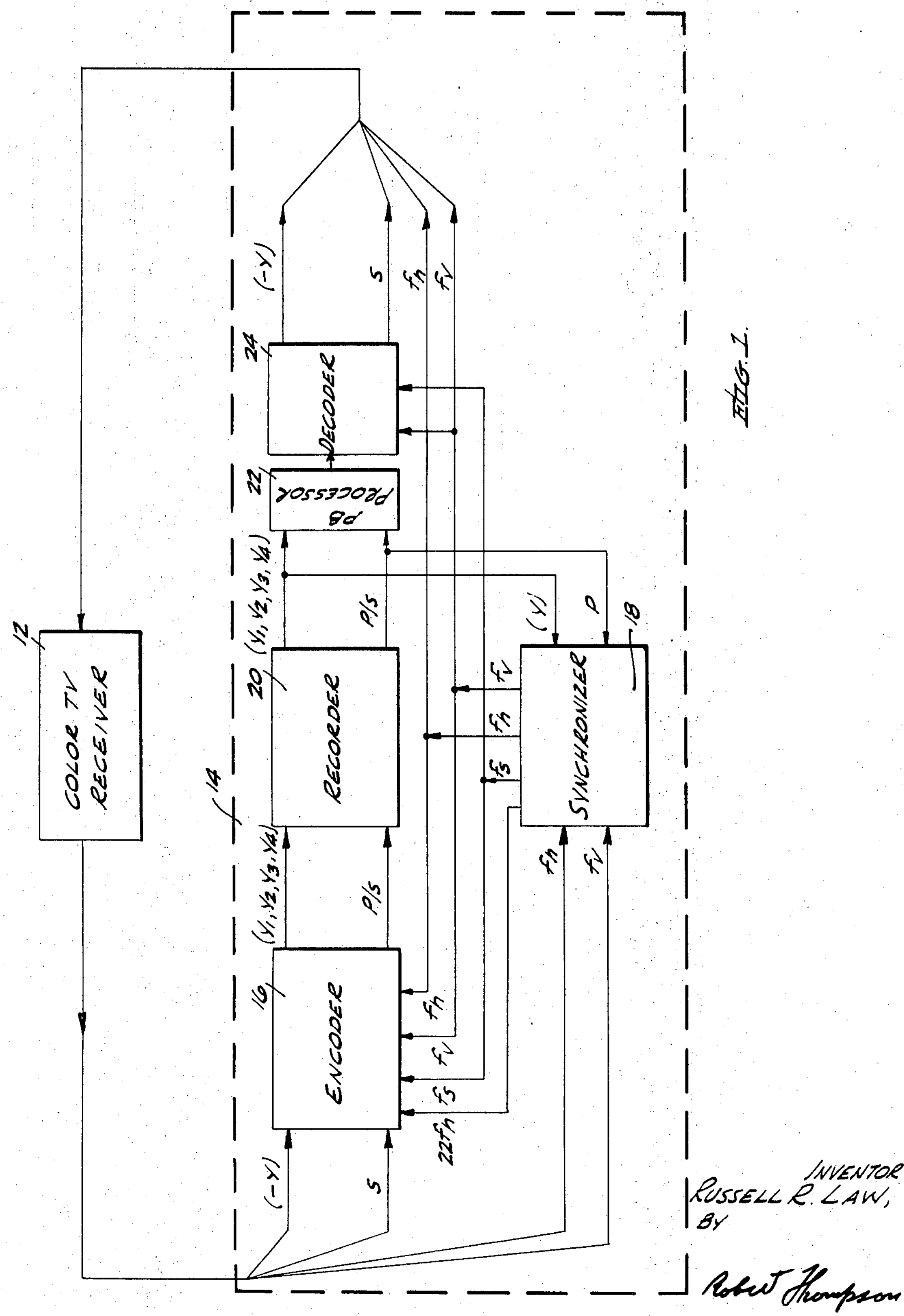
FIG. 1 is a block diagram of the improvements in the television system showing the relationship of an encoder, a recorder, and a decoder to a television receiver.

Referring now to an embodiment of a VTR (video tape recorder) system, FIG. 1 illustrates a circuit in which the luminance signal Y is received from a convenient tap point in a television receiver 12 by an encoder circuit 16. The encoder 16 is selectively controlled by the output signals from a synchronizer 18 for sampling the luminance signal Y in accordance with the sampling pattern graphically illustrated in FIG. 2.

During the encoding mode of operation, the synchronizer 18 is responsive to base frequency signals such as the vertical sync signal $f_v$ associated with the received television video signal Y to produce a tone burst signal $22f_h$, a vertical sync signal $f_v$, *a horizontal sync signal* $f_h$, and a sampling signal $f_s$, all in synchronization with each other, which are applied to the encoded video signal, as is explained in more detail in my copending application Ser. No. 563,763, entitled TELEVISION BANDWIDTH REDUCTION, filed on Jul. 8, 1966. The tone burst signal $22f_h$, generated by the synchronizer 26, is applied to the start of each field coincident with the generated vertical sync signal $f_v$. Thereafter, this tone burst signal $22f$ $22f_h$ can be utilized as a reference signal by the synchronizer 18 during playback, as described in my previously referenced copending patent application. In addition, the sampling sync signal $f_s$ generated by the synchronizer 18 is fed to the encoder 18 wherein the encoder samples the luminance signal Y in the following manner.

The encoder 16 operably samples the luminance signal so that: the evenly spaced information elements $Y_1$ are sampled on a first field; and the information elements $Y_2$ are sampled on the second field; the information elements $Y_3$ are sampled on the third field; and the information elements $Y_4$ are sampled on the fourth fir field. Thereafter, the above-described sequence can be continually repeated or else the sampling sync signal $f_s$ can be time shifted and the information segments which are blank and are illustrated as containing no information in FIG. 2 can be sampled in this repetitive pattern of four complementary fields, thereby producing two alternating sets of fields.

The sampling rate or period is such that there is a residue of $n/6$ in the number of sampling periods and consequently samples taken per line during each field so that the sampling pattern on subsequent fields retrogrates to the left by one-sixth of a sampling period, and the same area is sampled again only after two full resolution frames (one-fifteenth second) or four reduced resolution fields. The resulting evenly spaced and symmetrically positioned sample video information elements $Y_1$, $Y_2$, $Y_3$ and $Y_4$ are fed to a recorder 20 wherein they are sequentially recorded on a single channel. In addition, an audio signal S is received from the television receiver 12 and a pilot signal P related to the repetition rate and pulse position of the sampling signal $f_s$ is received from the synchronizer 18 and fed through the encoder 16 wherein they are mixed on a single channel and recorded on a single track in the recorder 20.

On playback, the magnetic tape or other recording medium in the recorder 20 is rerun past playback heads so that the channels of video information which include the tone burst signal $22f_h$ and sampled luminance data $Y_1$, $Y_2$, $Y_3$, and $Y_4$ and the pilot signal P are reproduced. The luminance signals $Y_1$, $Y_2$, $Y'Y_3$ and $Y_4$ are fed on a frame-by-frame basis through a playback processor 22 wherein they are each used a plurality of times on a field-by-field basis, as will be explained in more detail, in response to the vertical sync signal $f_v$ generated by the synchronizer 18 in a decoding mode of operation.

In order to generate the vertical sync signal $f_v$, the synchronizer 18 is responsive to the tone burst signal $22f_h$ on the played back sampled luminance signals and the played back pilot signal P. As a result, the vertical sync signal $f_v$, a horizontal sync signal $f_h$, and a sampling sync signal $f_s$ are generated by the synchronizer 18 as is s explained in more detail in my copending Pat. application Ser. No. 563,763.

The played back fields of sampled video information $Y_1$, $Y_2$, $Y_3$ and $Y_4$ are fed over a single channel to the playback processor 22 wherein each frame of video information is played back four times on four sequential frames. One embodiment of the playback processor 22, as illustrated in more detail in FIG. 4, includes a magnetic tape 30 having the sampled video information recorded on the segments indicated by the reference characters $Y_1'$, $Y_2'$, $Y_3'$, $Y_4'$, $Y_1''$, $Y_2''$, $Y_3''$, $Y_4''$, $Y_1'''$, $Y_2'''$, $Y_3'''$, and $Y_4'''$, with the single prime indicating the leading field and the multiple primes indicating the trailing fields when the magnetic tape 30 is moving in the direction indicated by the arrow. A playback head 32, having a plurality of spaced pickups 34, 36, 38 and 40, is positioned adjacent the magnetic tape 30 so that the video information is reproduced by being played back from four of the fields concurrently and combined in a select manner during each field, as will be described with reference to FIG. 2*a*.

Referring now the to the details of the playback head 32, each of the pickups 34 through 40 are spaced one field apart relative to the video information recorded on the magnetic tape 30. For example, if the magnetic tape 30 is run at 30 inches per second, then, since each field has a duration of one-sixtieth of a second, each field will be recorded on a segment of tape one-half an inch long; consequently, the spacing of the pickups of is also one-half an inch. In order to compensate for the fact that the line adjacent to and above the real-time line, such as line 2 of the even numbered fields, will occur one line sooner than the real-time line (line 3) of the odd numbered field relative to the very first line of each field, or vice versa for the even numbered real-time fields, nondelayed outputs and delayed outputs equal to increments of time $\Delta t$, where $\Delta t$ equals the duration of one horizontal video line (63.4 substantially microseconds), are provided for the signals played back by each pickup.

Figure 2:
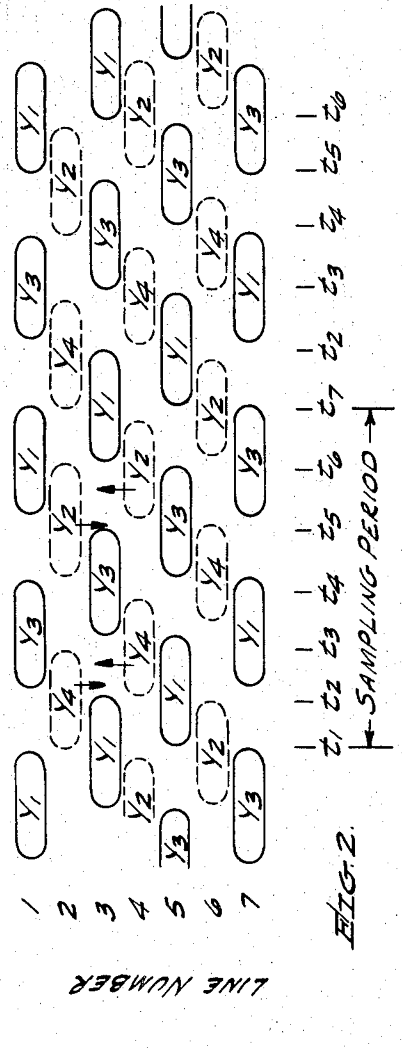
FIG. 2 is a graphical illustration showing preferred sampling patterns of a portion of a video picture in which individual information bits are illustrated as solid line rectangles for a first sequence of four complementary fields, and the vertical arrows indicating the playback position assumed by the artificial elements relative to a real-time element.
Figure 3:
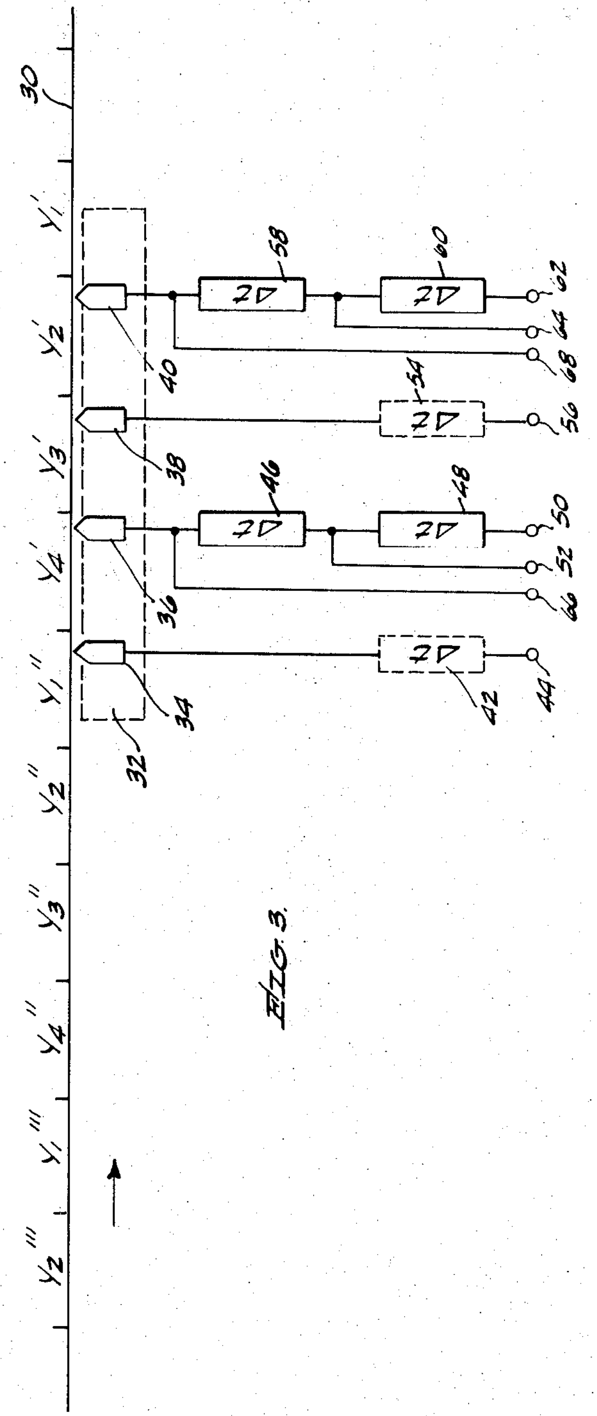
FIG. 3 is a schematic diagram showing playback pickups in a first embodiment of the playback processor relative to a magnetic recording medium having interlaced fields of information elements recorded on segments thereof.

In operation, it is assumed that the pickup 34 is first playing back the video information $Y''_1$ which is arbitrarily designated as real-time video information elements and, more specifically, as the real-time video information from the centroid of sampled video elements $Y''_1$ of line 3 of an odd numbered field. Then, at the time $t_1$, as illustrated in FIG. 2, the centroid of the real-time element $Y''_1$ played back by the pickup 34 emerges from a $\Delta t$ delay line 42, where $\Delta t$ = 63.4 microseconds or the duration of one horizontal video line, and appears at an output terminal 44.

Thereafter, at time $t_2$ which is one-sixth of a sampling period after the centroid of the real time information element $Y''_1$ had appeared at the output terminal 44 an artificial element $Y'_4$ played back by the pickup 36 from the adjacent line above (line 2) of a leading field, one field in advance of the real time field as a result of the pickup spacing, has been conducted through two $\Delta t$ delay lines 46 and 48, emerges therefrom, and appears at output terminal 50.

Thereafter, at a time $t_3$ which is one-sixth of a sampling period after the centroid of artificial element $Y'_4$ has appeared at the output terminal 50, the centroid of artificial element $Y'_4$ played back by pickup 36 from the adjacent line below (line 4) of the leading field, one field in advance of the real-time field emerges from the delay line 46 and appears at an output terminal 52.

Thereafter, at a time $t_4$ which is one-sixth of a sampling period later, the centroid of an artificial element $Y'_3$ played back by the pickup 38 from the same line as the real-time line (line 3) of a leading field, two fields in advance of the real-time field, in is conducted through a $\Delta t$ delay line 54 and appears at an output terminal 56.

Then at a time $t_5$ the centroid of an artificial element $Y'_2$ played back from a leading field three fields in advance of the real-time field by the pickup 40 from the adjacent line above (line 2) because of the three field spacing between pickups 34 and 40, is conducted through two $\Delta t$ delay lines 58 and 60, emerges from the delay line 60 and appears at an output terminal 62.

Then at a time $t_6$ which is one-sixth of a sampling period after the centroid of the artificial element $Y'_2$ from the preceding line appeared at the terminal 62, the centroid of an artificial element $Y'_2$ is played back by the pickup 40 from the adjacent line below of the leading field, three fields in advance, whereupon the artificial element $Y'_2$ emerges from the $\Delta t$ delay line 58 and appears on an output terminal 64.

Thereafter, this above-described sequence is repeated for the entire real-time field $Y''_1$.

For the next field, the magnetic tape 30 has advanced so that the real-time elements are the sampled information elements $Y''_2$ played back by the pickup 34, the artificial elements $Y''_1$, $Y'_4$ and $Y'_3$ are played back by the pickups 36, 38 and 40, respectively, and the real time and artificial elements are combined in the following sequence.

At time $t_6$ the real-time element $Y''_2$ played back by the pickup 34 emerges from the delay line 42 and appears on the output terminal 44.

At time $t_1$ the artificial element $Y''_1$ played back by the pickup 36 from the adjacent line above emerges from the delay line 46 and appears on the output terminal 52.

At time $t_2$ the artificial element $Y''_1$ played back by the pickup 36 from the adjacent line below appears on a nondelayed output terminal 66.

At time $t_3$, the artificial element $Y'_4$ played back by pickup 38 from the same line in a leading field as the real-time line emerges from the delay line 54 and appears on the output terminal 56.

At time $t_4$ the artificial element $Y'_3$ played back by pickup 40 from the adjacent line above of a leading field emerges from the delay line 58 and appears on the output terminal 64.

At time $t_5$ the artificial element $Y'_3$ played back by pickup 40 from the adjacent line below of the leading field is conducted to and appears on a nondelayed output terminal 68.

During the next real-time field, the video information is recombined in the following sequence.

At time $t_4$ real-time elements $Y''_3$ played back by pickup 34 emerge from the delay line 42 and appear at the output terminal 44.

At the time $t_5$ artificial elements $Y''_2$ played back by pickup 36 from the adjacent line above of a leading field emerge from the delay lines 46 and 48 and appear at the output terminal 50.

At the time $t_6$ artificial elements $Y''_2$ played back by pickup 36 from the adjacent line below of the leading field emerge from delay line 46 and appear in the output terminal 52.

At the time $t_1$ artificial elements $Y''_1$ played back by pickup 38 from the same line of a leading field emerge from delay line 54 and appear at the output terminal 56.

At time $t_2$, artificial elements $Y'_4$ played back by pickup 40 from the adjacent line above of a leading field emerge from delay lines 58 and 60 and appear at the output terminal 62.

At the time $t_3$, artificial elements $Y'_4$ played back by pickup 40 from the adjacent line below of the leading field emerge from the delay line 58 and appear at the output terminal 64.

During the fourth real-time frame in this sequence, the real-time information elements $Y''_4$ and the artificial information elements are combined in the following sequence.

At the time $t_3$, the real-time information element $Y''_4$ played back by pickup 34 emerges from the delay line 42 and appears on the output terminal 44.

At the time $t_4$, an artificial element $Y''_1$ played back by pickup 36 from the adjacent line above of a leading field emerges from the delay line 46 and appears on the output terminal 52.

At the time $t_5$ an artificial element Y $Y''_1$ played back by pickup 36 from the adjacent line below of the leading field appears at the nondelayed output terminal 66.

At the time $t_6$, an artificial element $Y''_2$ played back by pickup 38 from the same line of a leading field as the real-time line emerges from the delay lines 54 and appears on the output terminal 56.

At the time $t_1$ an artificial element $Y''_3$ played back by pickup 40 from the adjacent line above of a leading field emerges from the delay line 58 and appears at the output terminal 64.

At the time $t_2$, an artificial element $Y''_3$ played back by pickup 40 from the adjacent line below of the leading field appears on the nondelayed output terminal 68.

For the next field, the real time element played back by pickup 34 becomes $Y'''_1$ and the entire field sequence described above is repeated for the next four fields.

Figure 4:
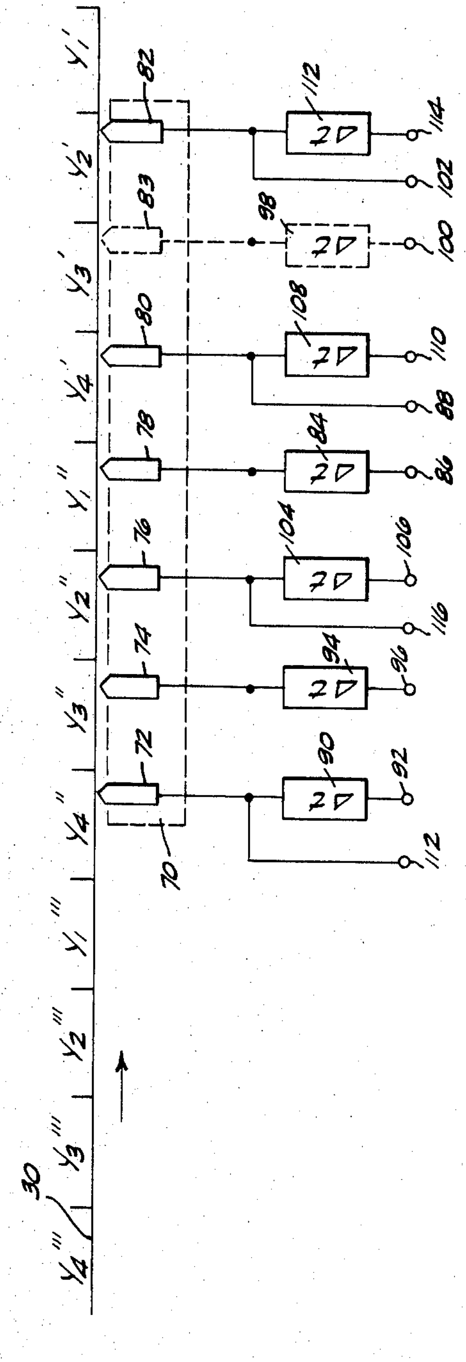
FIG. 4 is a schematic diagram showing the playback pickups in a second embodiment of the playback processor relative to a magnetic tape having interlaced fields of information elements recorded on segments thereof.

It should, of course, be understood that the artificial information element could be taken from the leading field rather than the trailing field if the direction of tape movement during recording and playback were in just the opposite direction indicated by the arrow in FIG. 4.

It should also be understood that if the pickup 38 were arbitrarily designated to provide the real-time information element, then the artificial elements played back by the other pickups would be a combination of artificial elements from the leading and trailing fields.

In addition, it should be understood that the pickups delay lines 42 and 54 could be eliminated by spacing the pickups 36 and 28 from the pickup 34 by an additional increment ΔL, where ΔL equals the duration of one horizontal video line (63.4 microseconds). As a result, the real time and artificial elements would still appear at the output terminal 44, 50, 52, 56, 62, 66 and 68 in the proper sequence.

The played back real time and artificial elements are received from the output terminals of the playback processor by the decoder 24 on eight parallel channels wherein they can be sampled by eight video gates of the type described in my previously referenced copending U.S. Pat. application, which are responsive to the sampling signal generated by the synchronizer 18 during the encoding mode of operation, whereupon the eight channels of information elements can be combined into a single channel of video information and displayed in the manner illustrated in FIG. 2.

In a second embodiment of the playback processor as illustrated in FIG. 4, the artificial information elements from trailing and leading fields are reproduced and combined with the real-time information elements in the manner illustrated in FIG. 2. More specifically, the magnetic tape 30 has the sampled luminance information recorded on a single channel thereof in the same manner as was previously described with reference to FIG. 4. Operably coupled to play back information from the magnetic tape 30 is a playback head 70 having six pickups, 72, 74, 76, 78, 80 and 82, which are spaced one video field apart relative to the video information recorded on magnetic tape 30.

More specifically, if the pickup 78 is arbitrarily considered to be the real-time pickup which plays back the real-time data from the magnetic tape 30, the pickups 72, 74 and 76 to the left of the real-time pickup 78 are considered to be the trailing pickups while the pickups 80 and 82 to the right of the real-time pickup 78 are considered to be the leading pickups when the magnetic tape 30 is moving in the direction of the arrow. The trailing pickups 72, 74 and 76 are spaced from the real-time pickup by integral multiples of one video field relative to the information recorded on the magnetic tape 30 and will play back the artificial element from the adjacent line below the real time horizontal video line in trailing video fields. The leading pickups 80 and 82 are spaced from the real-time pickup 78 by integral multiples of a video field (one field and three fields, respectively) and will play back the artificial elements from the adjacent line above the real-time line in the leading video fields as was described with reference to the previous embodiment. These artificial elements are combined with the real-time element at equally spaced intervals equal to about one-sixth of a sampling period.

In operation, the kickup pickups 72 through 82 of the playback head 70 playback the information elements and combine them into sequence as graphically illustrated in FIG. 2. For example, assume that the pickup 78 plays back the real-time video information from the centroid of sampled video information $Y''_1$ which is then conducted through Δ$t$ delay line 84 whereupon after a one line delay, the element $Y''_1$ appears at output terminal 86 at the time $t_1$.

Thereafter, at the time $t_2$, which is one-sixth of a sampling period after the centroid of the real time element $Y''_1$ has been played back, an artificial element $Y'_4$ from the adjacent line above of a leading field is played back by the pickup 80 and appears at the nondelayed output terminal 88 thereof.

Thereafter, at a time $t_3$, which is one-sixth of a sampling period later, the centroid of an artificial element $Y''_4$ on the adjacent line below the real-time line played back by the pickup 72 from a trailing video field, is conducted through a delay line 90, and appears at the output terminal 92.

Then at a time $t_4$, one-sixth of a sampling period later, the centroid of an artificial element $Y''_3$ of the same line as the real-time line played back by the pickup 74 from a trailing video field emerges from the Δ$t$ delay line 94 and appears at the output terminal 96. Alternatively, an artificial element $Y'_3$ from the same line as the real-time line could be played back from a leading field by the pickup 83 illustrated in dashed line in FIG. 4 conducted through a delay line 93, whereupon it appears at the output 100 at time $t_4$.

Thereafter, in either case, at a time $t_5$, which is one-sixth of a sampling period later, the centroid of artificial element $Y'_2$ played back from the adjacent line above in a leading video field by the pickup 82 appears at the nondelayed output terminal 102 because of the three fields spacing in the heads.

Thereafter, at a time $t_6$ which is one-sixth of a sampling period later, the centroid of an artificial $Y''_2$ played back from the adjacent interlace line below of a trailing video field by the pickup 76 emerges from the Δ$t$ delay line 104 and appears at the output terminal 106.

Then at one-sixth of a sampling period later, the centroid of the real-time element $Y''_1$ is again played back by the pickup 78 and the above-described sequence is repeated for the rest of the field.

After the magnetic tape 30 has moved relative to the pickup a distance equal to one video field, the next video field is being played back, whereupon the pickup 78 plays back the information element $Y''_2$ as the real-time information element, with the information elements $Y''_1$, $Y'''_1$, $Y'_3$ or $Y''_3$, $Y''_4$ and $Y'_4$ being used as the artificial information elements, as follows.

At time $t_5$ a real-time element $Y''_2$ played back by pickup 78 appears at the output terminal.

At the time $t_6$ an artificial element $Y''_1$ played back from adjacent line above of a leading field by pickup 80 emerges from a Δ$t$ delay line 108 and appears at the output terminal 110.

At the time $t_1$ an artificial element $Y'''_1$ from the adjacent lines below of a trailing video field played back by pickup 72 appears at a nondelayed output terminal 112.

At the time $t_2$ an artificial element $Y''_1$ played back from the same line of a trailing field as the real time line by a pickup 74 emerges from Δ$t$ delay line 94 and appears at the output terminal 96.

At the time $t_3$ an artificial element $Y'_3$ played back from the adjacent line above of a leading field by pickup 82, emerges from delay line 112 and appears at output terminal 114.

At the time $t_4$ an artificial element $Y''_3$ played back from the adjacent line below of a trailing field by pickup 76 appears at a nondelayed output terminal 116.

Thereafter, the above sequence is repeated for the rest of the field.

On the next field, the real-time elements and the artificial elements are combined as follows:

At the time $t_4$ a real-time element Y''$_3$ played back by pickup 78 appears at the output terminal 86.

At the time $t_5$ an artificial element Y''$_2$ played back from the adjacent line above of a leading field by pickup 80 appears at the output terminal 88.

At the time $t_6$ an artificial element Y'''$_2$ played back from the adjacent line below of a trailing field by pickup 72 appears at the output terminal 92.

At the time $t1$ an artificial element Y'''$_1$ played back from the same line of a trailing field by pickup 74 appears at the output terminal 96.

At the time $t_2$ an artificial element Y'$_4$ played back from the adjacent line above of a leading field by pickup 82 appears at output terminal 102.

At the time $t_3$, an artificial element Y''$_4$ played back from the adjacent line below of a trailing field by pickup 76 appears at the output terminal 106.

Thereafter, the above-described sequence is repeated for the entire field.

During the next field, the sequence of combining real time and artificial elements is as follows.

At the time $t_2$ a real time element Y''$_4$ played back by pickup 78 appears at the output terminal 86.

At the time $t_3$ an artificial Y''$_3$ played back from the adjacent line above of a leading field by pickup 80 appears at the output terminal 110.

At the time $t_4$ an artificial element Y'''$_3$ played back from adjacent line below of a trailing field by pickup 72 appears at the output terminal 112.

At the time $t_5$ an artificial element Y'''$_2$ played back from the same line of a trailing field by pickup 74 appears on the output terminal 96.

At the time $t_6$ an artificial element Y''$_2$ played back from the adjacent line above of a leading field by pickup 82 appears at the output terminal 114.

At the time $t_1$ an artificial element Y'''$_1$ played back from the adjacent line below of a trailing field by pickup 76 appears at the output terminal 116.

Thereafter, the entire sequence is repeated for the remainder of the field.

After four fields, the entire four field sequences described above are again repeated.

It should, of course, be understood that if the pickup 84 were used instead of the pickup 74, the artificial elements on the same line as the real-time elements would be taken from the leading field rather than from a trailing field as described above.

It should further be understood that the small increment $\Delta L$ of spacing added to the selected pickups relative to pickups 84, and 94 or 98, to eliminate the $\Delta t$ delay line 84, and 94 since the output of these pickups would about 63.4 microseconds sooner, much in the same manner as was previously described in the first embodiment.

The six outputs of the playback head 70 are fed to the decoder 24 illustrated in FIG. 1.

The decoder 24 is responsive to the sampling sync signal $f_s$ generated by the synchronizer 18 during the decoder mode of operation and selectively combines the 10 channels of input information onto a single channel in the sequence illustrated in FIG. 2. The specific circuitry for sampling and gating these input signals is of the type described and illustrated in my previously referenced copending application.

While the salient features have been illustrated and described with respect to a particular embodiment it should be readily apparent that modifications can be made within the spirit and scope of the invention, and it is therefore not desired to limit the invention to the exact details shown and described.

I claim:

1. In a video system for receiving a repetitive series of fields of spaced and complementary video elements in which the video elements of each subsequent field retrograde by a portion of a time period, a playback processor comprising:

first means for reproducing video elements from video lines of a first field of the series of fields at first times in the time periods;

second means for reproducing video elements from adjacent video lines of a second sequential field at second times and third times each respectively at one-sixth of and four-sixths of the time period between spaced sequential video elements being played back by said first means;

third means for reproducing video elements from the same video line of a third sequential field as the video being reproduced from the first field at fourth times three-sixths of the time period between spaced sequential video elements being played back by said first means; and fourth means for reproducing video elements from adjacent video lines of a fourth sequential field at fifth times and sixth times each respectively four-sixths of and five-sixths of the time period between spaced sequential video elements being played back by said first means.

2. The playback processor of claim 1 in which said second means and said fourth means reproduce video elements from the adjacent video line above and the adjacent video line below the video line being reproduced by said first means.

3. The playback processor of claim 1 in which pickup means of said first means and said third means are spaced from one another by multiples of one field and said pickup means of said second means and said fourth means are spaced from said pickups of said first means and said third means by multiples of one field plus increments of one horizontal video line.

4. The playback processor of claim 1 in which said first means, said second means, and said third means, and said fourth means each include a pickup means, each pickup means being spaced from the other for playing back video elements from a first field, a second field, a third field, and a fourth field, respectively, and delay means selectively coupled to said pickup means for selectively delaying the played back video elements to be reproduced at the selected times.

5. The playback processor of claim 4 in which said pickup means are equally spaced.

6. The playback processor of claim 4 in which said pickup means of said first means and said third mean means are spaced from one another by integral multiples of one field and said pickup means of said second means and said fourth means are spaced from said pickups of said first means and said third means by integral multiples of one field and increments of one horizontal video line.

7. The playback processor of claim 4 in which said first means, said second means, said third means, and said fourth means include a plurality of spaced apart magnetic pickups operable for playing back the video elements from a magnetic tape.

8. In a video system for receiving a series of fields of spaced and complementary video elements in which the video elements of each subsequent field retrograde by one-sixth of a time period, a playback processor comprising:

first means for reproducing at select time periods video elements from video lines of a first field of the series of fields;

second means for reproducing video elements from an adjacent video line from other fields of the series of fields spaced in a first direction from the field being reproduced by said first means the elements of each subsequent field direct being played back at second times and fifth times, each of the times being respectively spaced one-sixth of and four-sixths of the time period between spaced sequential video elements being played back by said first means;

third means for reproducing video elements from an adjacent video line from other fields of the series of fields spaced in a second direction from the field being played back by said first means the elements of each field being played back at third times and sixth times, each of the times being respectively spaced one-sixth of and four-sixths of the time period between spaced sequential video elements being played by said first means; and fourth means for reproducing video elements from the same video line as the line being reproduced by said first means from fields spaced from the first field in a predetermined direction, the video elements being played back at fourth times spaced three-sixths of the time period between spaced sequential video elements being played back by said first means.

9. The playback processor of claim 8 in which said second means and said third means reproduce video elements from the adjacent video line above and the adjacent video line below the video line being reproduced by said first means.

10. The playback processor of claim 9 in which said second means reproduces video elements from the adjacent video line above the video line being reproduced by said first means and said third means reproduces video elements from the adjacent video lines below the video line being reproduced by said first means.

11. The playback processor of claim 9 in which said first means, said second means, said third means, and said fourth means include a plurality of spaced apart magnetic pickups for playing back the video elements.

12. The playback processor of claim 11 in which said first means, said second means, said third means, and said fourth means include delay means coupled to said pickups for selectively delaying the played back video elements to occur at selected times.

13. The playback processor of claim 11 in which said pickups are evenly spaced by increments of one video field.

14. The playback processor of claim 13 in which said delay means delay the video elements by increments of one horizontal video line.